(12) United States Patent
Guillard et al.

(10) Patent No.: US 6,319,303 B1
(45) Date of Patent: Nov. 20, 2001

(54) PROCESS FOR PURIFYING A GAS AND CORRESPONDING SYSTEM

(75) Inventors: Alain Guillard, Paris; Patrick Le Bot, Vincennes, both of (FR)

(73) Assignee: L'Air Liquide, Societe Anonyme pour l'Etude et l'Exploitation des Procedes Georges Claude, Paris Cedex (FR)

(*) Notice: Subject to any disclaimer, the term of this patent is extended or adjusted under 35 U.S.C. 154(b) by 0 days.

(21) Appl. No.: 09/694,310

(22) Filed: Oct. 24, 2000

(30) Foreign Application Priority Data

Oct. 25, 1999 (FR) .................................................. 99 13274

(51) Int. Cl.[7] .......................... B01D 53/04; B01D 53/047
(52) U.S. Cl. .................... 95/97; 95/118; 95/122; 95/139; 96/132; 423/230
(58) Field of Search .................................. 95/96, 97, 104, 95/117, 122, 139, 118; 96/121, 131, 132, 133, 144; 423/230

(56) References Cited

U.S. PATENT DOCUMENTS

| 4,249,915 | * | 2/1981 | Sircar et al. |  |
| 4,985,052 | * | 1/1991 | Haruna et al. | 95/101 |
| 5,811,630 | * | 9/1998 | Dandekar et al. | 95/99 |
| 5,938,819 | * | 8/1999 | Seery | 95/104 |
| 6,146,450 | * | 11/2000 | Duhayer et al. | 96/130 |

FOREIGN PATENT DOCUMENTS

| 0 579 290 |   | 1/1994 | (EP). |
| 0 612 554 |   | 8/1994 | (EP). |
| 0 904 823 |   | 3/1999 | (EP). |
| 1-155926 A | * | 6/1989 | (JP). |
| WO 85/00118 A | * | 1/1985 | (WO). |

* cited by examiner

Primary Examiner—David A. Simmons
Assistant Examiner—Frank M. Lawrence
(74) Attorney, Agent, or Firm—Young & Thompson

(57) ABSTRACT

In this process for purifying a gas by adsorption of a first impurity and of a second impurity, at least two main adsorbers (5A, 5B) and at least one auxiliary adsorber (6A, 6B) are used, the main adsorbers comprising a packing (8A, 8B, 9A, 9B) for adsorbing the first and second impurities. During at least a first step, the gas is purified by adsorbing the two impurities by passing through at least a first (5A, 5B) of the main adsorbers without passing through a first auxiliary adsorbers (6A, 6B), and simultaneously the second main adsorber (5A, 5B) and the or each auxiliary adsorbers (6A, 6B, 6) is regenerated in parallel, then, during a second step, at least some of the gas flow is purified by adsorption of the two impurities by passing in series through the first main adsorber (5A, 5B) and through the first auxiliary adsorber (6A, 6B). Application, for example, to the purification of air for the purpose of its distillation.

18 Claims, 5 Drawing Sheets

PROCESS FOR PURIFYING A GAS AND CORRESPONDING SYSTEM

FIELD OF THE INVENTION

The present invention relates to a process for purifying a gas by adsorption of a first impurity and of a second impurity, of the type in which several adsorbers are used cyclically and selectively in the adsorption phase and in the regeneration phase.

The invention is applicable, for example, to the purification of air for the purpose of distilling it.

BACKGROUND OF THE INVENTION

For such an application, it is known to use a purification system comprising two identical adsorbers, the operation of which alternates, i.e. one is in the adsorption phase while the other is in the regeneration phase.

When the air flow to be treated is large, it is also known to use four identical adsorbers coupled in pairs. The two adsorbers of one and the same pair operate in parallel. The operation of the two pairs of adsorbers alternates, so that one pair of adsorbers is in the adsorption phase while the other is in the regeneration phase. Such a parallel operation makes it possible to treat large flows while limiting the manufacturing constraints on the adsorbers.

SUMMARY OF THE INVENTION

An object of the invention is to provide a process of the aforementioned type which makes it possible, especially, to reduce even more the costs of manufacturing or of operating an air distillation plant in which the process is implemented.

To this end, the subject of the invention is a process of aforementioned type, characterized in that at least two main adsorbers and at least one auxiliary adsorber are used, in that, during at least a first step, the gas is purified by adsorbing the two impurities by passing through at least a first of the main adsorbers without passing through a first auxiliary adsorber, and in that simultaneously the second main adsorber and the or each auxiliary adsorber are regenerated in parallel, then, during a second step, at least some of the gas flow is purified by adsorption of the two impurities by passing in series through the first main adsorber and through the first auxiliary adsorber.

According to particular embodiments, the process may comprise one or more of the following characteristics, taken in isolation or in any technically possible combination:

during the second step, the pressure of the gas between the first main adsorber and the first auxiliary adsorber is changed;

during the second step, the gas between the first main adsorber and the first auxiliary adsorber is compressed;

only one auxiliary adsorber is used;

between the first step and the second step, the gas is purified by adsorbing the two impurities by passing through a second main adsorber;

at least two auxiliary adsorbers are used;

the first step is interrupted when the first main adsorber is substantially saturated with the second impurity;

each auxiliary adsorber comprises an adsorption packing comprising a single adsorbent material;

the first impurity is $H_2O$ and the second impurity $CO_2$;

the gas is air.

The subject of the invention is also a system for purifying a gas in order to implement a process as defined hereinabove, characterized in that it comprises a line for supplying the gas to be purified, a line for discharging the purified gas, a line for supplying a regeneration gas, a line for discharging the regeneration gas, at least two main adsorbers and at least one auxiliary adsorber, the main adsorbers comprising a packing for adsorbing the first and second impurities, and each auxiliary adsorber comprising a packing for absorbing at least the second impurity, and in that the system furthermore comprises first connection means, in order to connect the main adsorbers to the line for discharging the purified gas without passing through the auxiliary adsorber or without passing through any of the auxiliary adsorbers, second connection means, in order to connect each main adsorber in series with an auxiliary adsorber, and third connection means, in order to connect the or each auxiliary adsorber and at least one main adsorber in parallel with the line for supplying the regeneration gas.

According to particular embodiments, the system may comprise one or more of the following characteristics, taken in isolation or in any technically possible combination:

the said second connection means include means for changing the gas pressure;

the said second connection means include compression means;

the purification system comprises a single auxiliary adsorber;

the purification system comprises at least two auxiliary adsorbers;

each auxiliary adsorber comprises an adsorption packing comprising a single adsorbent material;

the first impurity is $H_2O$ and the second impurity $CO_2$; and the gas is air.

BRIEF DESCRIPTION OF THE DRAWINGS

The invention will be better understood on reading the description which follows, given solely by way of example, and with reference to the appended drawings, in which.

DETAILED DESCRIPTION OF THE INVENTION

Figure 1:
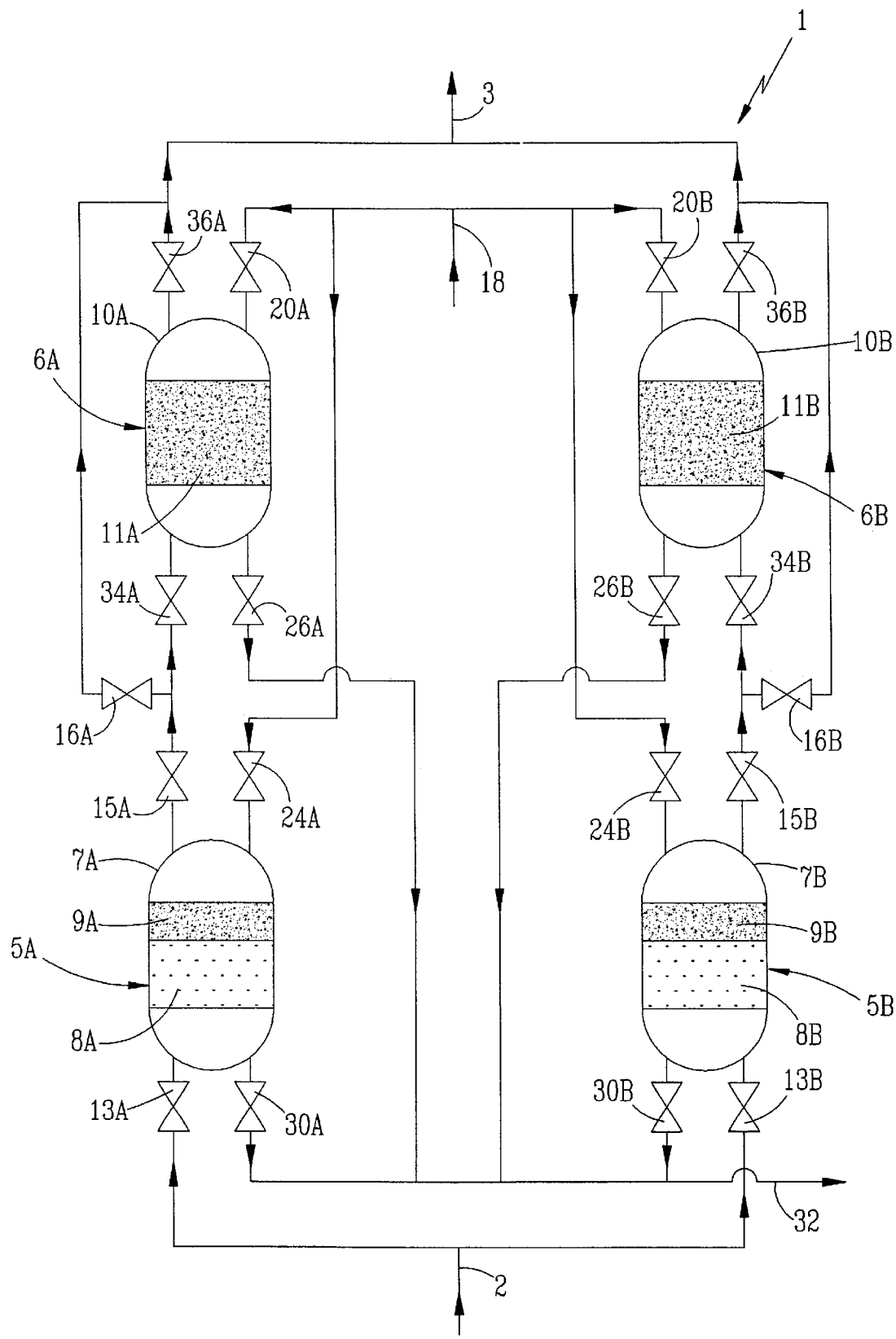
FIG. 1 is a schematic view of a purification system according to the invention.

FIG. 1 shows a purification system 1 of an air distillation plant. This system 1 can operate by varying the temperature and/or pressure. This system 1 is designed to remove the majority of the impurities, and especially the $H_2O$ and $CO_2$, contained in a stream of compressed air at a pressure of between 4 and 50 bar and supplied by a line 2, in order to feed, via a line 3, a main heat exchange line and then an air distillation apparatus. The latter components are not shown in order not to overload FIG. 1. The air distillation apparatus may be, for example, a medium-pressure column of a double air distillation column.

The purification system 1 comprises two identical main adsorbers 5A and 5B and two identical auxiliary adsorbers 6A and 6B.

Each main adsorbers 5A, B comprises a container or bottle 7A, B containing successively, in the adsorption direction which is vertical and directed upwards, a layer 8A, B of a material capable of adsorbing $H_2O$, for example alumina, and a layer 9A, B of a material capable of adsorbing $CO_2$, for example a molecular sieve. The layer 8A, B has a thickness which is clearly greater than that of the layer 9A, B. In variants not shown, the material of the layers 8A, B and 9A, B may be similar. The object is then to obtain a material capable of adsorbing the two impurities. Thus, the material of the layer 8A, B generally represents between 60% and 100% of the adsorption packing loaded in the container 7A, B.

Each auxiliary adsorber 6A, B comprises a container 10A, B in which a single layer 11A, B of a material capable of adsorbing $CO_2$, for example, the same material as that of the layers 9A and 9B, is placed.

The purification system 1 furthermore comprises a certain number of valves and connecting pipes, the position of which will now become apparent during the description of the process implemented in the purification system 1.

This process is carried out by repetition of a cycle comprising four successive steps I to IV.

During step I, the main adsorber 5A is in the adsorption phase, while the main adsorber 5B and the auxiliary adsorbers 6A and 6B are in the regeneration phase.

The air of the line 2 is then supplied through an open valve 13A to the main adsorber 5A. The air successively passes through the layer 8A, where $H_2O$ is completely adsorbed, then the layer 9A, where $CO_2$ is completely adsorbed. The purified air, i.e. the dried and decarbonated air, is then sent via two open valves 15A and 16A directly to the line 3, i.e. without passing through another adsorber.

During this time, waste nitrogen which is possibly heated and channelled by a line 18 and coming, for example, from the top of the low-pressure column of the air distillation plant, feeds in parallel:

the auxiliary adsorbers 6A and 6B, via two open valves 20A and 20B, and the main adsorber 5B via an open valve 24B.

This waste nitrogen flows through the adsorbers 5B, 6A and 6B in the regeneration direction, i.e. in the opposite direction to the adsorption direction, regenerating these adsorbers, the layers 8B, 9B, 11A and 11B of which have been substantially saturated during a previous cycle.

The waste nitrogen transporting the desorbed $H_2O$ and $CO_2$ is then sent, on the one hand, from the auxiliary adsorbers 6A and 6B via open valve 26A and 26B and, on the other hand, from the main adsorber 5B via an open valve 30B, to a discharge line 32.

This step I is continued until the layer 9A is substantially saturated with $CO_2$ and until the adsorber 6A is regenerated.

During step II, the valves 16A, 20A and 26A are closed and the air, dried by the layer 8A and exiting the main adsorber 5A, is sent to the auxiliary adsorber 6A via an open valve 34A. The air purification is then continued therein by adsorption of the $CO_2$ in the layer 11A. The dried and decarbonated air exiting the auxiliary adsorber 6A is then sent via an open valve 36A directly to the line 3.

During this step II, the auxiliary adsorber 6A is therefore in the adsorption phase in order to purify the air in series with the main adsorber 5A.

The main 5B and auxiliary 6B adsorbers are, as in step I, regenerated in parallel. This step II continues until the layer 8A is substantially saturated with $H_2O$ or until the layer 11A is substantially saturated with $CO_2$, and until the main adsorber 5B is regenerated.

During step III, the adsorber 5B is in the adsorption phase, purifying the air of the line 2 on its own.

The adsorbers 5A, 6A and 6B are regenerated in parallel. The path of the air and of the waste nitrogen can be deduced from the description of step I by reversing the suffices A and B.

This step III continues until the layer 9B is substantially saturated with $CO_2$ and until the adsorber 6B is regenerated.

During step IV, the main 5B and auxiliary 6B adsorbers purify the air of the line 2 in series, the main 5A and auxiliary 6A adsorbers being in the regeneration phase. The path of the air and of the waste nitrogen can be deduced from description of step II by reversing the suffices A and B.

Step IV continues until the adsorber 5A is regenerated and until the layer 8B is substantially saturated with $H_2O$ or until the layer 11B is substantially saturated with $CO_2$.

During steps I and III, the head loss between the lines 2 and 3 is limited since the air is purified only by the main adsorber 5A or 5B which are small in size.

Moreover, the main adsorbers 5A and 5B are regenerated during half of the cycle, but the auxiliary adsorbers 6A and 6B are regenerated during three steps of the cycle, i.e. steps I, III and IV in respect of the auxiliary adsorber 6A and steps I, II and III in respect of the adsorber 6B. Because of the relatively long regeneration time of these auxiliary adsorbers 6A and 6B, the waste nitrogen flow, needed for regeneration and flowing in the line 18, is small. Consequently, the head losses upstream of the line 18 are also small.

Thus, the costs associated with the compression of the air in the distillation plant are small.

Moreover, the air flowing through the auxiliary adsorbers 6A and 6B is dry. There is therefore no $H_2O$ to desorb from the adsorbers 6A and 6B. Thus the regeneration direction in the auxiliary adsorbers 6A and 6B may be directed upwards. The adsorption direction in the adsorbers 6A and 6B may therefore be directed downwards, which makes it possible to increase the adsorption rate and therefore to reduce the dimensions of the containers 10A and 10B.

Figure 2:
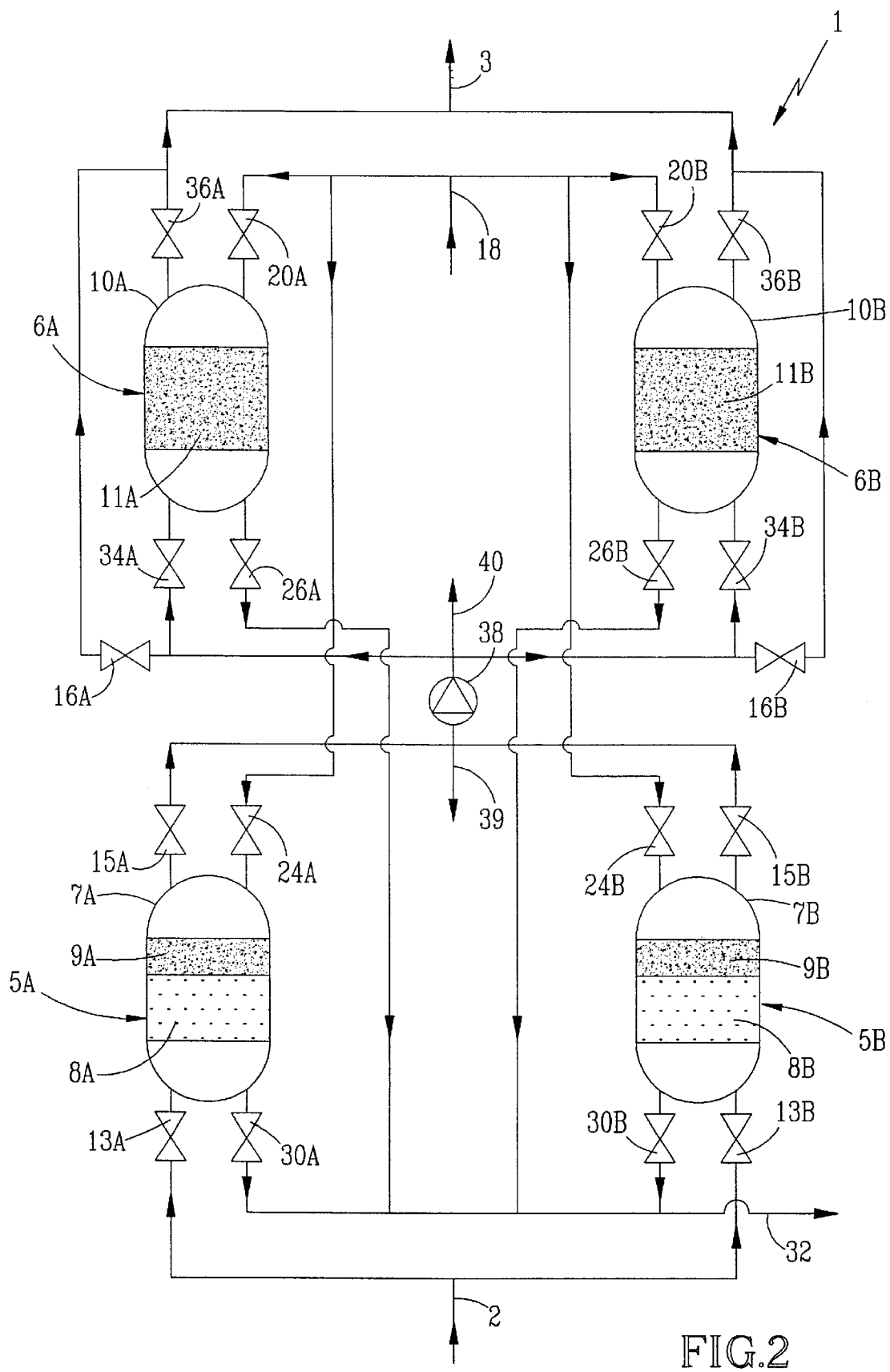
FIGS. 2 to 5 are views similar to FIG. 1, illustrating two variants of the system for the process of FIG. 1 and two variants of another embodiment of the invention.

According to the variant in FIG. 2, a compressor 38 is placed between, on one hand, the valves 15A and 15B and, on the other, the valves 16A, 16B, 34A and 34B, in order to compress the air feeding the line 3.

This compressor 38 is, for example, coupled to a turbine placed downstream of an intermediate outlet of the main heat exchange line of the air distillation plant, as described in the applications FR-2 674 011, FR-2 701 553 and FR-2 723 184.

This compressor 38 compresses the purified air coming from the main adsorber 5A during step I, the dry air coming from the main adsorber 5A and feeding the auxiliary adsorber 6A during step II, the purified air coming from the main adsorber 5B during step III and the dried air coming from the main adsorber 5B and feeding the auxiliary adsorber 6B during step IV.

The compression of the air by the compressor 38 before its passage through the auxiliary adsorbers 6A and 6B during steps II and IV makes it possible to improve the adsorption of $CO_2$ in these adsorbers.

Taps 39 and 40, placed on one side between the valves 15A and 15B and the compressor 38 and on the other side between the compressor 38 and the valves 16A, 16B, 34A and 34B, make it possible to feed systems, not shown, with dry air. Thus, only some of the air dried by the main adsorbers 5A and 5B can be decarbonated in the auxiliary adsorbers 6A and 6B.

According to another variant, not shown, the compressor 38 is replaced with a turbine. This turbine expands the purified air coming from the adsorber 5A during step I, the dried air coming from the adsorber 5A and feeding the adsorber 6A during step II, the purified air coming from the adsorber 5B during step III and the dried air coming from the adsorber 5B and feeding the adsorber 6B during step IV.

The expansion of the air by the turbine, and therefore its cooling, before it passes through the auxiliary adsorbers 6A and 6B during steps II and IV makes it possible to improve the adsorption of $CO_2$ in these adsorbers.

Figure 3:
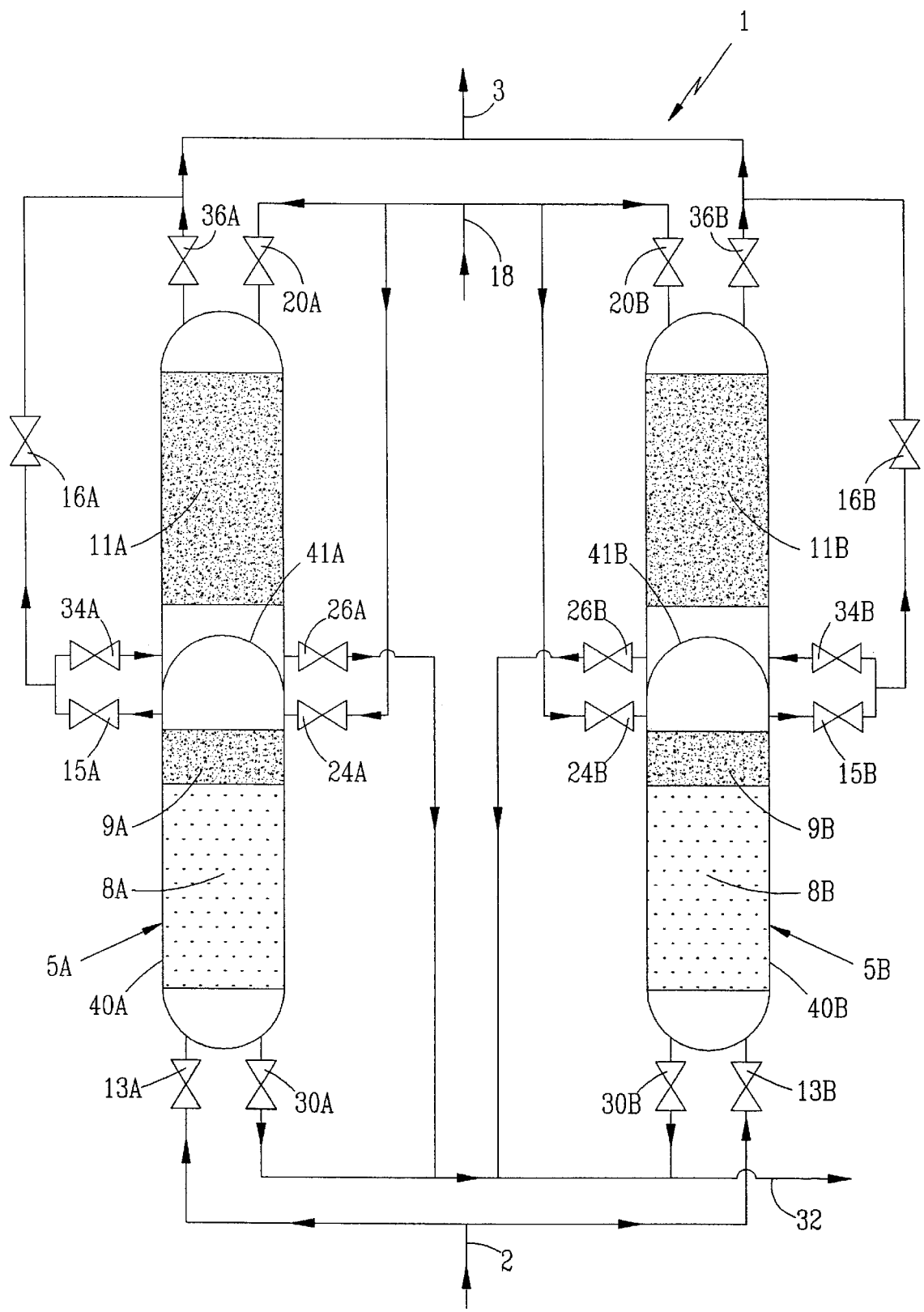

According to the variant in FIG. 3, the main and auxiliary adsorbers 5A and 6A are formed in the same container 40A, fitted with an intermediate internal wall 41A isolating the main adsorber 5A from the auxiliary adsorber 6A. The auxiliary adsorber 6A surmounts the main adsorber 5A. The wall 41A is domed and its concavity is directed towards the main adsorber 5A.

The structure of the main 5B and auxiliary 6B adsorbers is similar and is deduced from that of adsorbers 5A and 6A by substituting the suffix B for the suffix A.

This variant makes it possible to reduce the cost of manufacturing the adsorbers 5A, SB, 6A and 6B and therefore the cost of manufacturing the air distillation plant.

Figure 4:
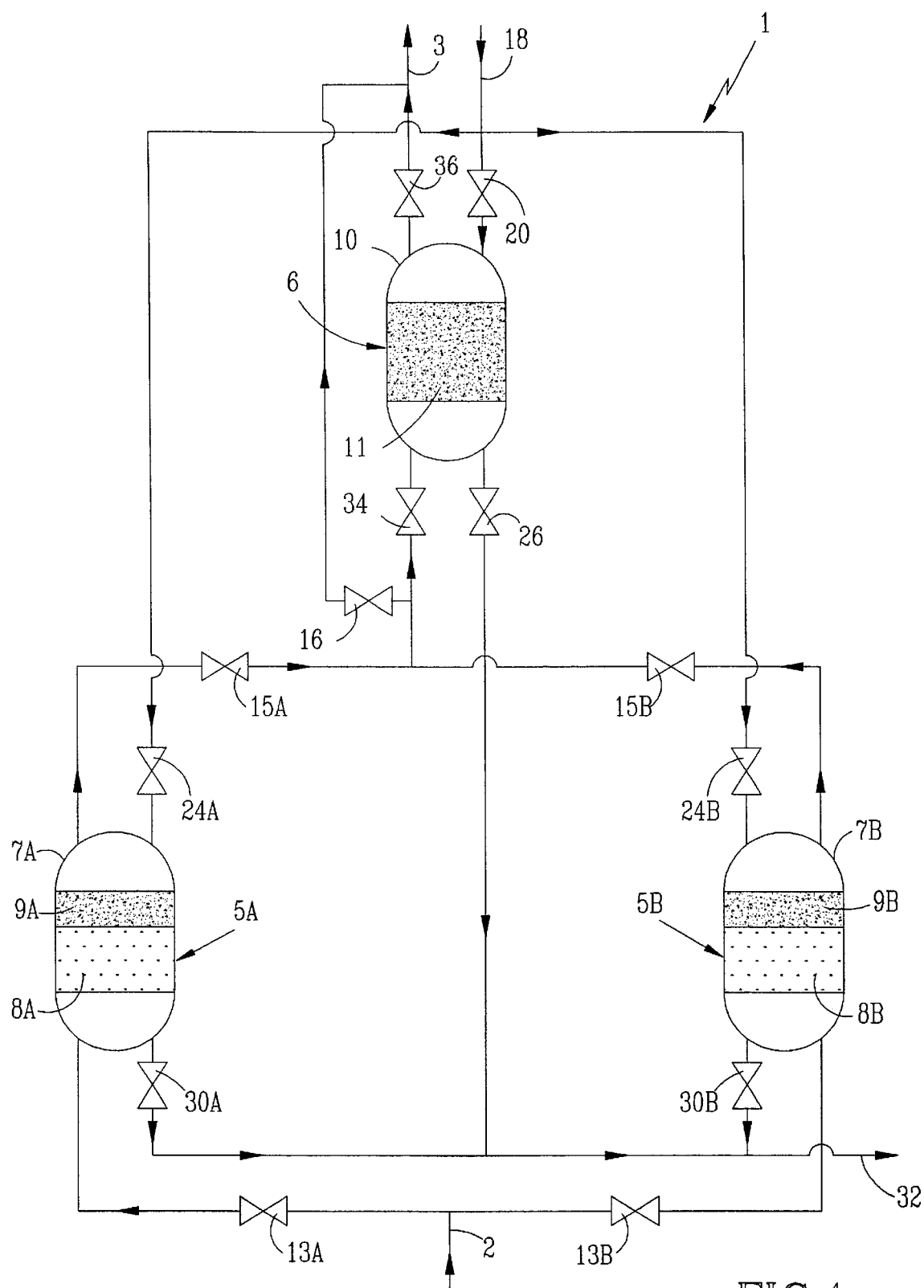

FIG. 4 illustrates another embodiment of an air purification system 1 which differs from that of FIG. 1 by the fact that the purification system 1 comprises only a single auxiliary adsorber 6. The references of the components relating to this auxiliary adsorber 6 will be the same as those relating to the adsorbers 6A and 6B of FIG. 1, the suffices A and B being removed.

The cycle of the purification process implemented by this purification system 1 also comprises four steps I to IV described hereinbelow.

During step I, the main adsorber 5A is in the adsorption phase, while the main 5B and auxiliary 6 adsorbers are in the regeneration phase.

The air of the line 2 is then supplied by the open valve 13A to the main adsorber 5A, where it is completely decarbonated and dried. This purified air is then sent, via the open valves 15A and 16, directly to the line 3.

The waste nitrogen of the line 18 feeds, in parallel, the auxiliary adsorber 6 via the open valve 20 and the main adsorber 5B via the open valve 24B.

The waste nitrogen, transporting the $CO_2$ and $H_2O$ that have accumulated in the layers 8B, 9B and 11 during a previous cycle and desorbed, is sent from the adsorbers 6 and 5B, via the open valves 26 and 30B, to the line 32.

This step I continues until the layer 9A is substantially saturated with $CO_2$ and until the adsorber 5B is regenerated.

During step II, the air is purified only by the adsorber 5B. The air of the line 2 is then sent to the adsorber 5B via the open valve 13B. The dried and decarbonated air is then sent directly to the line 3 via the open valves 15B and 16.

The valves 13A, 15A, 24A and 30A are closed so that the adsorber 5A is neither in the adsorption phase nor in the regeneration phase.

The auxiliary adsorber 6 is in the regeneration phase.

This step II is continued until the layer 9B is substantially saturated with $CO_2$ and until the auxiliary adsorber 6 is regenerated.

During step III, the air coming from the line 2 is sent via the open valve 13A to the main adsorber 5A, where it is dried. Next, the dried air is sent via the open valves 15A and 34 to the auxiliary adsorber 6 which decarbonates the air. The purified air is then sent directly to the line 3 via the open valve 36.

The adsorbers 5A and 6 are therefore in the adsorption phase in order to purify the air of line 2, in series.

The valves 13B, 15B, 24B and 30B are closed so that the auxiliary adsorber 5B is neither in the adsorption phase nor in the regeneration phase.

This step III continues until the layer 8A is substantially saturated with $H_2O$.

During step IV, the adsorbers 5B and 6 purify the air in series. The path of the waste air can be deduced from the description of step III by substituting the suffix B for the suffix A.

Moreover, the adsorber 5A is in the regeneration phase. The waste nitrogen of the line 18 is then sent via the open valve 24A to the main adsorber 5A. The waste nitrogen transporting the desorbed $H_2O$ and $CO_2$ is then sent via the open valve 30A to the line 32.

Step IV continues until the layer 8B is substantially saturated with $H_2O$.

The process hereinabove makes it possible to purify a relatively large air flow with only three adsorbers 5A, 5B and 6. Consequently, the cost of manufacturing the air purification system 1, and therefore the air distillation plant, is relatively low.

Figure 5:
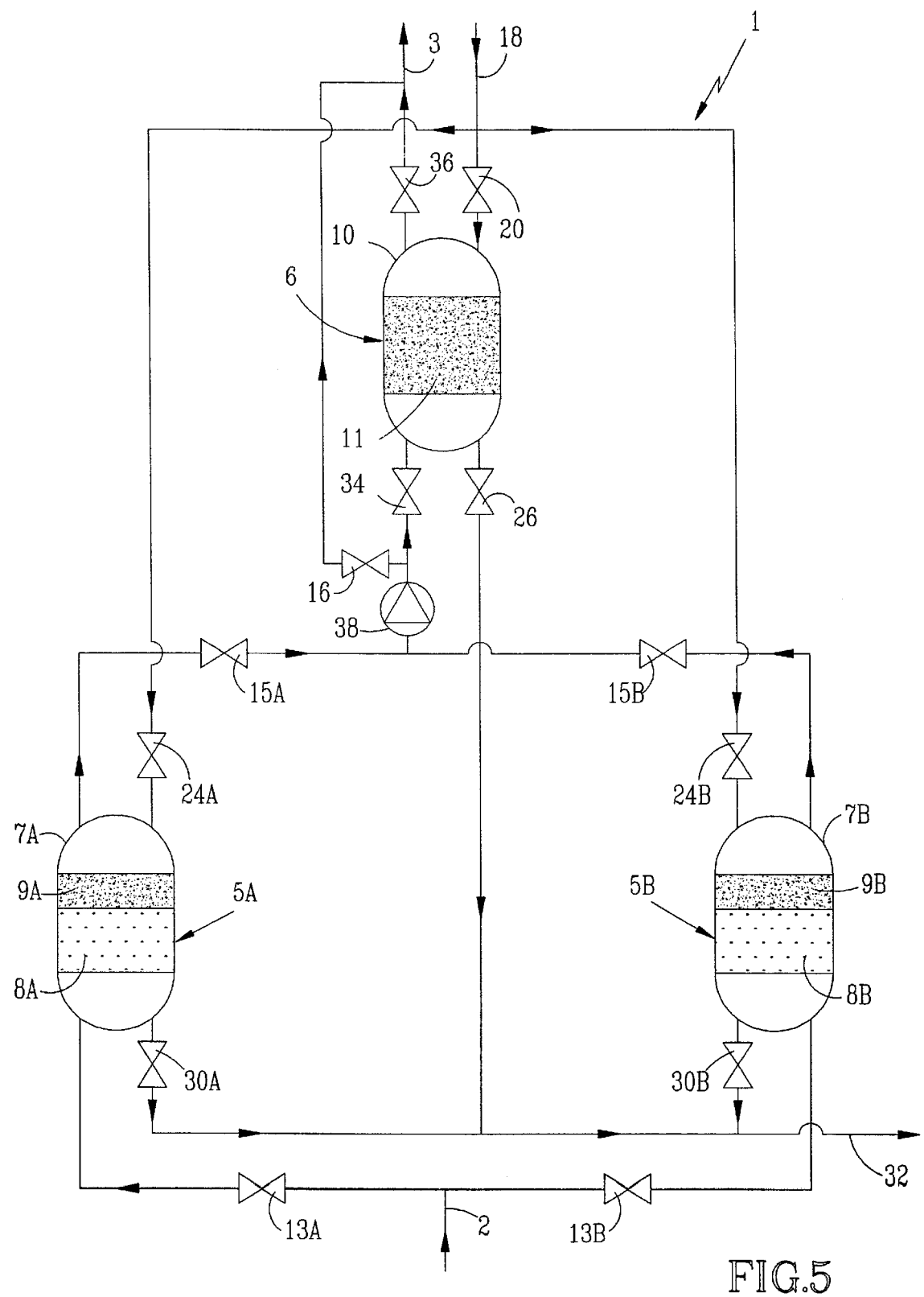

According to the variant of FIG. 5, a compressor 38 is placed between, on one hand, the valves 15A and 15B and, on the other, the valves 16 and 34. This compressor 38 corresponds to that of the variant of FIG. 3.

The compressor 38 compresses the dried and decarbonated air coming from the main adsorbers 5A and 5B during steps I and II, and the dried air coming from the main adsorbers 5A and 5B and feeding the auxiliary adsorber 6 in steps III and IV.

As previously, the compressor 38 may also be replaced with a turbine.

What is claimed is:

1. Process for purifying a gas by adsorption of a first impurity and of a second impurity, in which several adsorbers (5A, 5B, 6A, 6B; 5A, 5B, 6) are used cyclically and selectively in the adsorption phase and in the regeneration phase, characterized in that at least two main adsorbers (5A, 5B) and at least one auxiliary adsorber (6A, 6B; 6) are used, in that, during at least a first step, the gas is purified by adsorbing the two impurities by passing through at least a first (5A, 5B) of the main adsorbers without passing through a first auxiliary adsorber (6A, 6B; 6), and in that simultaneously the second main adsorber (5A, 5B) and the or each auxiliary adsorber (6A, 6B; 6) are regenerated in parallel, then, during a second step, at least some of the gas flow is purified by adsorption of the two impurities by passing in series through the first main adsorber (5A, 5B) and through the first auxiliary adsorber (6A, 6B; 6).

2. Process according to claim 1, characterized in that, during the second step, the pressure of the gas between the first main adsorber (5A, 5B) and the first auxiliary adsorber (6A, 6B; 6) is changed.

3. Process according to claim 2, characterized in that, during the second step, the gas between the first main adsorber (5A, 5B) and the first auxiliary adsorber (6A, 6B; 6) is compressed.

4. Process according to claim 1, characterized in that only one auxiliary adsorber (6) is used.

5. Process according to claim 4, characterized in that, between the first step and the second step, the gas is purified by adsorbing the two impurities by passing through a second main adsorber (5A, 5B).

6. Process according to claim 1, characterized in that at least two auxiliary adsorbers (6A, 6B) are used.

7. Process according to claim 1, characterized in that the first step is interrupted when the first main adsorber (5A, 5B) is substantially saturated with the second impurity.

8. Process according to claim 1, characterized in that each auxiliary adsorber (6A, 6B; 6) comprises an adsorption packing (11A, 11B; 11) comprising a single adsorbent material.

9. Process according to claim 1, characterized in that the first impurity is $H_2O$ and the second impurity $CO_2$.

10. Process according to claim 1, characterized in that the gas is air.

11. System for purifying a gas in order to implement a process according to claim 1, characterized in that the system comprises a line (2) for supplying the gas to be purified, a line (3) for discharging the purified gas, a line (18) for supplying a regeneration gas, a line (32) for discharging the regeneration gas, at least two main adsorbers (5A, 5B) and at least one auxiliary adsorber (6A, 6B; 6), the main adsorbers comprising a packing (8A, 8B, 9A, 9B) for adsorbing the first and second impurities, and each auxiliary adsorber (6A, 6B; 6) comprising a packing for adsorbing at least the second impurity, and in that the system furthermore comprises first connection means (15A, 15B, 16A, 16B; 15, 16), in order to connect the main adsorbers (5A, 5B) to the line (3) for discharging the purified gas without passing through the auxiliary adsorber or without passing through any of the auxiliary adsorbers, second connection means (15A, 15B, 34A, 34B; 15, 34), in order to connect each main adsorber (5A, 5B) in series with an auxiliary adsorber (6A, 6B, 6), and third connection means (20A, 20B, 24A, 24B; 20, 24A, 24B), in order to connect the or each auxiliary adsorber (6A, 6B; 6) and at least one main adsorber (5A, 5B) in parallel with the line (18) for supplying the regeneration gas.

12. System according to claim 11, characterized in that the said second connection means include means (38) for changing the gas pressure.

13. System according to claim 12, characterized in that the said second connection means include compression means (38).

14. System according to claim 11, characterized in that the system comprises a single auxiliary adsorber (6).

15. System according to claim 11, characterized in that the system comprises at least two auxiliary adsorbers (6A, 6B).

16. System according to claim 11, characterized in that each auxiliary adsorber (6A, 6B; 6) comprises an adsorption packing (11A, 11B; 11) comprising a single adsorbent material.

17. System according to claim 11, characterized in that the first impurity is $H_2O$ and the second impurity $CO_2$.

18. System according to claim 11, characterized in that the gas is air.

* * * * *